July 10, 1945. P. W. ROBINSON 2,380,265
ADJUSTABLE TRANSFORMER REGULATOR
Filed April 2, 1943 2 Sheets-Sheet 1
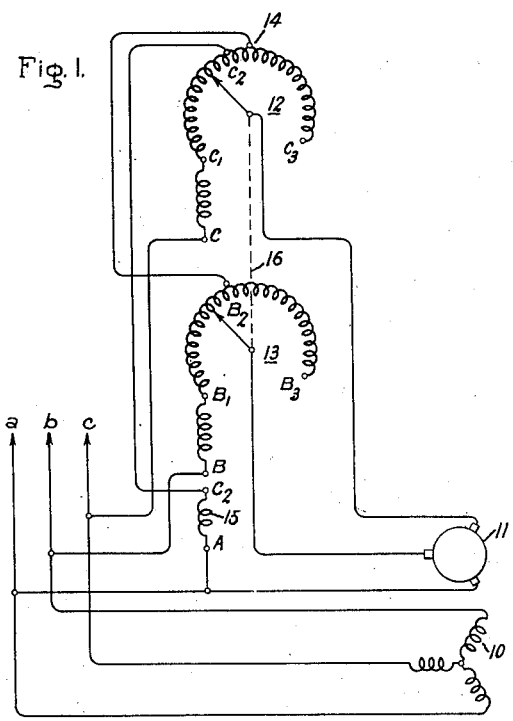
Fig. 1.
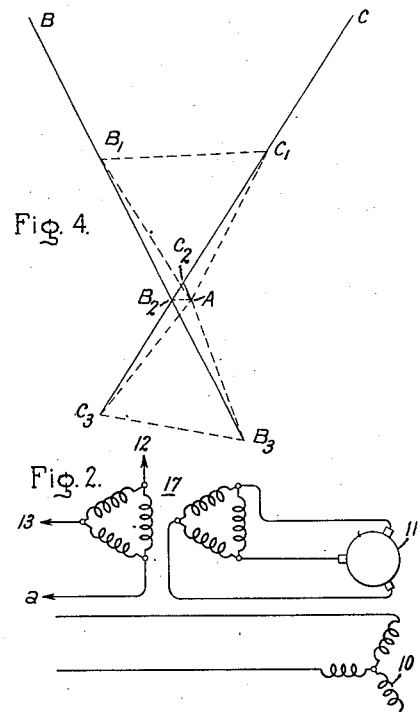
Fig. 4.
Fig. 2.
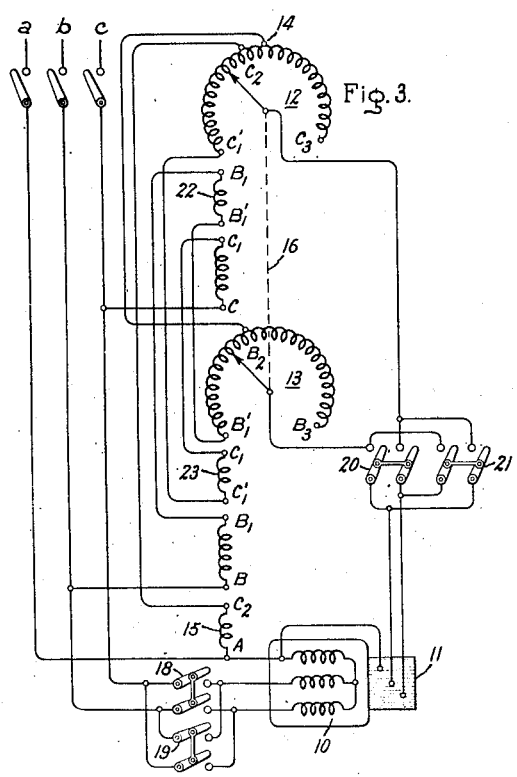
Fig. 3.
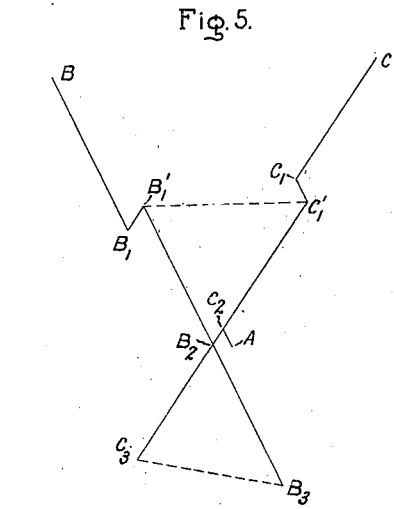
Fig. 5.
Inventor:
Percy W. Robinson,
by Harry E. Dunham
His Attorney.

July 10, 1945. P. W. ROBINSON 2,380,265
ADJUSTABLE TRANSFORMER REGULATOR
Filed April 2, 1943 2 Sheets-Sheet 2
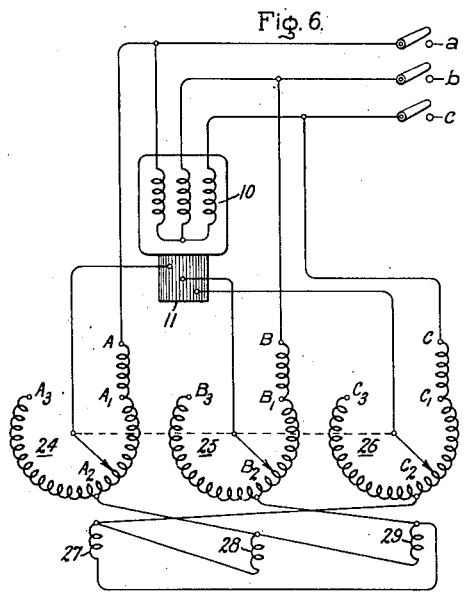
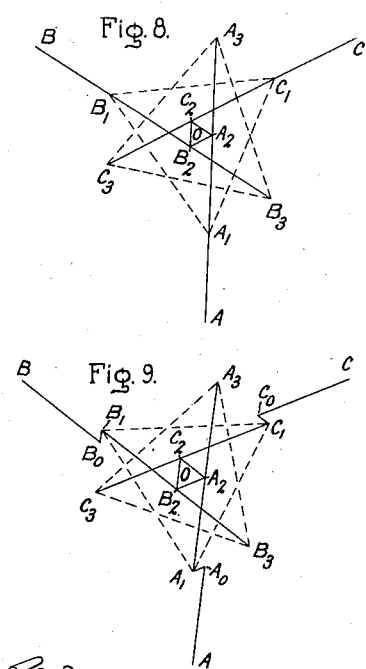
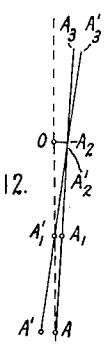
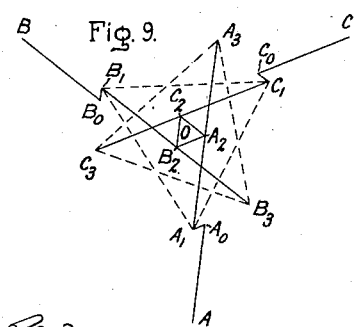
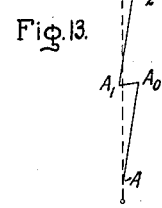
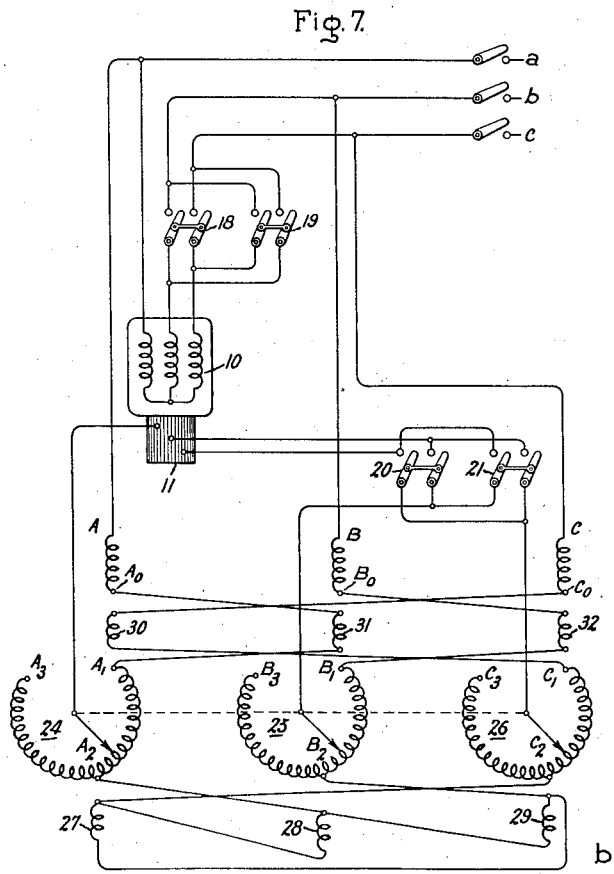
Inventor:
Percy W. Robinson,
by Harry E. Dunham
His Attorney.

Patented July 10, 1945

2,380,265

UNITED STATES PATENT OFFICE 2,380,265

ADJUSTABLE TRANSFORMER REGULATOR

Percy W. Robinson, Scotia, N. Y., assignor to General Electric Company, a corporation of New York Application April 2, 1943, Serial No. 481,566

9 Claims. (Cl. 172—274)

My invention relates to adjustable transformers and, in particular, to an adjustable auto transformer arrangement by means of which the magnitude and phase angle of polyphase voltages may be controlled. Although not limited thereto, my invention is particularly suitable for use between a polyphase source of supply and the commutator of a stator excited polyphase motor operated from such source for the purpose of varying the speed and controlling the power factor of such motor. It appears that in many instances the adjustable transformer of my invention will be less costly than, and will have other advantages over, induction voltage regulators commonly used for such purpose. See, for example, United States Patent No. 2,108,620.

The features of my invention which are believed to be novel and patentable will be pointed out in the claims appended hereto. A better understanding of my invention can be had from the following description taken in connection with the accompanying drawings which show in Fig. 1 a simple embodiment of my invention as applied to the regulation of a polyphase commutator motor. Fig. 2 illustrates how a step-down transformer may be included between the auto transformer apparatus and the commutator of the motor where that is desirable; Fig. 3 shows an arrangement like Fig. 1 with the addition of extra transformer winding sections and switches to enable the motor to be reversed without the necessity of resetting the motor brush position; Fig. 4 shows a vector diagram explanatory of the voltages obtained with the transformer apparatus of Fig. 1; Fig. 5 shows a vector diagram explanatory of the voltages obtained with the transformer apparatus of Fig. 3. In Figs. 1 and 3 essentially an open delta connection of two auto transformers is employed for three-phase service. Figs. 6 and 7 correspond to Figs. 1 and 3, respectively, except that instead of the open delta connection, three autotransformer units are employed for the same purpose; Figs. 8 and 9 are vector diagrams explanatory of the voltages obtained with the transformer arrangement of Figs. 6 and 7, respectively. Figs. 10 and 12 are explanatory of how the voltage vectors of Figs. 4 and 8, respectively, are shifted to obtain power factor adjustment by shifting the brushes of the motor of Figs. 1 and 6, respectively, from neutral. Figs. 11 and 13 are explanatory of power factor adjustment of the reversible motors of Figs. 3 and 7, respectively.

In Fig. 1, 10 represents the stator winding of a three-phase alternating current commutator motor and 11 the commutated rotor winding element thereof. $a$, $b$, and $c$ represent the three lines of a three-phase source of supply for the motor, and the remainder of the apparatus in Fig. 1 represents a transformer arrangement embodying my invention, connected between the source of supply and the brushes of the motor by means of which the speed and power factor of the motor may be controlled by varying the magnitude of the voltage across the brushes and shifting the phase of such voltage relative to the stator line terminal voltage of the motor. Such transformer apparatus comprises a pair of adjustable auto transformers 12 and 13, transformer 12 having the usual winding $CC_1C_2C_3$ with an extra fixed tap at 14, and transformer 13 having the usual winding $BB_1B_2B_3$ and an added auxiliary winding section 15 which is connected between phase $a$ of the line and a terminal $C_2$ of transformer 12. It is noted that phase $a$ of the line is connected directly to one of the brushes of the motor, transformer 12 has fixed terminal C connected to line phase $c$ and its adjustable terminal to another brush of the motor, while transformer 13 has fixed terminal B connected to line phase $b$ and its adjustable terminal to the third brush of the motor. The various terminals to be referred to on the transformer windings are designated with letter reference characters corresponding to the line phase to which they are connected, and the voltages of such terminals are designated in the vector diagram, Fig. 4, by like reference characters. The adjustable taps of the two transformers are interconnected by a mechanical connection indicated by dashed line 16 and will be adjusted together in the application shown in order to obtain equal voltages between the motor brushes for various different voltage adjustments.

In Fig. 4 the three-phase line voltages are designated by the points ABC. $AC_1B_1$ represents the voltage triangle across the motor brushes when the adjustable transformer taps are on points $C_1$ and $B_1$ of the autotransformers. As the adjustable transformer taps are moved in a clockwise direction, the brush voltage triangle swings counterclockwise in Fig. 4 about fixed point A and decreases in size. The C voltage follows the line $C_1C_2C_3$ and the B voltage follows the line $B_1B_2B_3$. The triangle becomes the smallest when the adjustable contact of transformer 12 is between points $C_2$ and 14, Fig. 1. When on tap $C_2$ the voltage triangle is represented in Fig. 4 as $AC_2B_2$. Further movement of adjustable taps to the right past tap 14 causes the brush voltage triangle to increase in size and to continue to swing counterclockwise about point A in Fig. 4 until the extreme terminals $C_3$ and $B_3$ are reached. The brush voltage triangle is then represented in Fig. 4 by $AC_3B_3$. Brush voltage triangle $AC_1B_1$ represents the voltage for maximum speed adjustment above synchronism and triangle $AC_3B_3$ the brush voltage for the lowest speed adjustment below synchronism. Triangle $AB_2C_2$ represents the brush voltage triangle at or about synchronous speed. It is thus seen that there is obtained a reversible brush voltage for operating the motor above and below synchronism.

In Fig. 10, I have represented at $C_1C_2C_3$ the variable brush voltage vector of transformer 12, Fig. 1. This is the vector which varies from $AC_1$ through $AC_2$ to $AC_3$. It is shifted in phase, as compared to the direction of the CA line voltage vector by the angle $ACC_2$ by reason of the voltage connection to line $a$ through the coil 15 of transformer 13. This shift introduces a quadrature component which is beneficial for power factor correction but which is not sufficient for this purpose, and hence, with the arrangement of Fig. 1, I shift the motor brushes from neutral in the proper direction until the direction of the C brush voltage vector of the motor is shifted, relative to the stator voltage represented by CA, to the line $C'C_1'C_2'C_3'$, Fig. 10, or by any other amount sufficient for proper power factor correction. The direction of this phase shift with respect to the stator voltage remains the same for operation above and below synchronism, and thus, the arrangement satisfies the requirement for this type of non-reversible motor installation.

Where the motor is large or the line voltage high, or both, it may be desirable to install a step-down transformer between the auto transformer regulator and the commutator brushes as represented by the transformer 17, Fig. 2. This expedient is applicable to the other modifications of the invention to be described.

In Figs. 3 and 5 the general scheme of reference characters used in connection with Figs. 1 and 4 is employed, and like parts are designated by like reference characters. The purpose of the differences between Fig. 1 and Fig. 3 is to enable the motor 10 of Fig. 3 to have its direction of rotation reversed without shifting the commutator brushes, and the necessary change in connections for reversing is accomplished by switches 18, 19, 20, and 21. For one direction of rotation switches 18 and 20 are closed and switches 19 and 21 are open, while for the opposite direction of rotation switches 18 and 20 are open and switches 19 and 21 are closed. This change reverses the power lines to two of the three stator terminals and two of the lines between the auto transformer regulator and motor brushes. When the direction of rotation of such a motor is reversed without any phase shift in the voltage applied to the brushes, it is necessary to shift the brushes to obtain the power factor correcting component for the new direction of rotation. If, however, in reversing, the proper phase shift of the voltage applied to the brushes be made, then the brushes do not need to be shifted to obtain power factor correction for the opposite direction of rotation. In Fig. 3 extra transformer coils 22 and 23 are provided to accomplish such phase shift in reversing the motor without otherwise disturbing the voltage adjusting features heretofore explained. In Fig. 3 the phase shift coil section 22 on the core of transformer 12 is interposed in series between the non-adjustable coil section $BB_1$ and the adjustable coil part of transformer 12. Also phase shift coil section 23 on the core of transformer 13 is interposed in series between the coil section $CC_1$ and the adjustable coil part of transformer 12. It will be understood that coils sections 15, $BB_1$ and 23 are wound on the same core with the adjustable coil of transformer 13, and that coil sections $CC_1$ and 22 are wound on the same core with the adjustable coil of transformer 12.

In Fig. 5, A, B and C designate the line voltages applied to the terminals of the same designation in Fig. 3. The brushes of the motor are in this case set on neutral and not shifted as with the arrangement of Fig. 1. The result of the transformer coil 22 is to shift the $B_1$ voltage of Fig. 4 to $B_1'$, Fig. 5, and transformer coil 23 shifts the $C_1$ voltage of Fig. 4 to $C_1'$, Fig. 5. Hence, the voltage applied to the motor by transformer 12 follows the line $C_1'C_2C_3$, Fig. 5, and the voltage applied to the motor by transformer 13 follows the line $B_1'B_2B_3$, Fig. 5. Voltage triangle $B_1C_1A$ of Fig. 4 becomes $B_1'C_1'A$ in Fig. 5, etc. The extent of the phase shift of vector $C_1'C_2C_3$ from a line drawn between C and $C_3$ is shown in Fig. 11, and by the use of a suitable number of turns in the transformer sections 22 and 23 the voltage variation range can be made the same as in Fig. 10.

In reversing the motor of Fig. 3 it is seen that the brush circuits are reversed between the transformer and the motor and not between the line and transformer. Thus by keeping the phase sequence of the voltages on the transformer group unchanged and reversing two leads to the commutator, the relative vector relations shown in Figs. 5 and 11 are unchanged when the motor is reversed, and the power factor and speed control are maintained for both directions of rotation and without shifting the motor brushes.

In Fig. 6 three auto transformers 24, 25, and 26 are used, each having separate auxiliary windings shown at 27, 28, and 29 wound on the corresponding transformer cores. Thus winding 27 is wound upon the core of auto transformer 24, etc. The adjustable taps of the three auto transformers will be mechanically interconnected so as to be adjusted together. The auto transformers are connected to the line in star with the auxiliary coils 27, 28, and 29 connected in delta to form the star connection. Winding 27 of transformer 24 is connected between the taps $B_2$ and $C_2$ of the other two transformers, winding 28 of transformer 25 is connected between taps $A_2$ and $C_2$ of transformers 24 and 26, and winding 29 of transformer 26 is connected between taps $A_2$ and $B_2$ of transformers 24 and 25.

The voltage vector relations are shown in Fig. 8, and the voltages corresponding to different points on the transformer windings are designated by corresponding references, the letters A, B and C designating the three different phases and line voltages. It is evident that by adjusting the auto transformers the three-phase voltages applied to the motor brushes can be varied in magnitude and reversed in direction for speed variation above and below synchronism. By shifting the motor brushes in the proper direction, a power factor correcting component of desirable magnitude may be obtained. Fig. 12 shows the variable brush voltage vector $A_1A_2A_3$ with the brushes on neutral and at $A_1'A_2'A_3'$ when the brushes have been shifted for additional power factor correction. 0, Figs. 8 and 12, represents an imaginary neutral voltage point of the voltages of coils 27, 28, and 29.

Fig. 7 represents a reversing motor control using a regulating transformer arrangement like Fig. 6, but with transformer coils 30, 31, and 32 added on the cores of transformers 24, 25, and 26, respectively, for shifting the transformer voltages as shown at $A_0A_1$, Figs. 9 and 13, for power factor correction with the brushes set on neutral in order that the motor may be reversed without shifting the motor brushes. Switches 18, 19, 20, and 21 serve to reverse two leads in the stator and rotor motor circuits for reversing. The speed control voltage has a reversible component for speed control above and below synchronism as represented by $A_1A_2$, Fig. 9, for super-synchronous speed variation and $A_2A_3$ for sub-synchronous speed variation. Power factor correction is obtained by an amount determined by the shifting of rotor vector $A_1A_3$ out of line with the stator voltage vector of the same phase, the direction of which is AO. The transformer windings 27, 28, and 29 assure that there will be some control voltage and power factor correction while passing through synchronism; the transformer windings 30, 31, and 32 determine the extent of power factor correction; adjustable tap transformers 24, 25, and 26 vary the speed control voltage; and switches 18, 19, 20, and 21 enable the motor to be reversed. The combination enables speed control above and below synchronism in either direction of rotation with power factor correction, without the necessity of shifting the motor brushes which are set on neutral.

Auto transformer apparatus of the character described has certain advantages over double induction voltage regulators for the same purpose as follows: reduced cost, lower magnetizing kva., lower impedance drop and absence of torque in the regulating apparatus.

While the invention has been described for controlling the regulating voltage of a motor, it is not limited to such application but can be used wherever an adjustable polyphase voltage is desired. The extent and direction of phase shift, the range of voltage regulation, and the magnitude of the minimum voltage may be changed to suit requirements by a suitable choice of the number of turns in the different transformer windings and by the manner of their connections.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination with a polyphase source of supply, a polyphase load, and means for impressing a substantially balanced polyphase voltage on said load from said source which voltage varies in magnitude and phase relation relative to the source of supply, said means including a plurality of separate single-phase auto transformers, each having a winding connected across two phases of said source through a winding section on another of said transformers, such connections for the different transformers being across different phases of said source, said transformers having taps which are independent of the last-mentioned connections, adjustable along said windings and connected to the load the adjustable taps on the different transformers being mechanically connected together so as to be adjustable in fixed relation to each other, said taps having a range of adjustment along their transformer windings past the points which are connected to the winding section on another transformer.

2. In combination with a polyphase source of supply, a polyphase motor having a polyphase stator winding, excited from said source and a commutated winding with a polyphase system of brushes, and means for impressing a variable polyphase voltage across said brushes such as to control the speed of the motor above and below synchronism and for shifting the phase of such variable polyphase voltage relative to the stator voltage in a direction to improve the power factor of the motor, said means including a plurality of separate single-phase auto transformers each having a winding connected across two phases of said source of supply through a winding section on another of said auto transformers, such connections for the different transformers being across different phases of said source, said transformer windings having adjustable taps which are independent of the last-mentioned connections connected to different brushes of said motor, the taps on the different transformers being mechanically connected together so as to be adjustable in fixed relation to each other.

3. In combination with a polyphase source of supply, a polyphase load, and means for impressing a substantially balanced polyphase voltage on said load from said source which voltage varies in magnitude and phase relation relative to said source of supply including a plurality of auto transformers one less in number than the number of phases of said supply and load, each having a winding connected across the two phases of said source through a winding section on another of said transformers, such connections for the different transformers being across different phases of said source, said transformers each having a tap adjustable along its winding, the taps of the different transformers being mechanically interconnected so as to be adjustable together, connections between said taps and a corresponding number of the phases of said load, and a connection between the remaining load phase and a phase of said supply source.

4. In combination with a three-phase source of supply, a three-phase load, and means for supplying said load from said source with a substantially balanced three-phase voltage which can be varied in magnitude and phase relation relative to the source comprising two auto transformers having main windings connected at one end to two phases of said supply and having taps adjustable along said windings connected to two phases of said load, the third phase of said load being connected directly to the third phase of said supply, an auxiliary winding on one transformer connected between said third supply phase and a fixed tap on the adjustable main winding of the other transformer and a connection between other fixed taps of the main windings of both transformers, the two adjustable taps on the transformers being mechanically connected together for simultaneous adjustment.

5. In combination, a three-phase source of supply and a load comprising a three-phase, stator excited, commutator motor having three-phase brushes, a connection between one of said brushes and one supply phase, a pair of similarly adjustable auto transformers interconnected between the supply and other brushes by means of which the brush voltage may be varied in magnitude and direction relative to the stator voltage to control the speed of the motor, said transformers having auxiliary windings connected in series relation to the auto transformer supply connections selected, as to the number of turns and with respect to the other supply connections of the auto transformers to produce a balanced polyphase brush voltage having a phase relation relative to the stator voltage which is beneficial for power factor correction.

6. In combination, a three-phase source of supply and a load comprising a three-phase, stator excited, commutator motor with three-phase brushes, a connection between one of said brushes and one supply phase, and a pair of similarly adjustable auto transformers interconnected between the line and other brushes and by means of which the voltage on the brushes may be varied in magnitude and direction relative to the stator voltage to control the speed of said motor, the supply connections of said transformers including an auxiliary winding on one transformer connected between said one supply phase and a fixed tap on the other auto transformer, selected with respect to the other supply connections of said transformers to produce a substantially balanced polyphase voltage at the motor brushes.

7. In combination with a three-phase source of supply, a three-phase load, and means for supplying said load from said source with a substantially balanced three-phase voltage which can be varied in magnitude and phase relation and have its phase rotation reversed comprising first and second auto transformers, both having adjustable and non-adjustable main winding sections and phase shifting winding sections, taps adjustable along the adjustable portions of the main winding sections connected to two phases of said load, said connections including means for reversing said connections, a direct connection between the third phase of said load and one supply phase, said other supply phases being connected to the non-adjustable and adjustable winding sections of the first and second transformers respectively with the phase shifting winding sections of the second and first transformers respectively interposed in series relation between said main winding sections, an auxiliary winding on the first transformer connected between said direct connection and a fixed tap on the adjustable winding section of the second transformer and a connection between other fixed taps of the adjustable winding sections of both transformers.

8. In combination, a three-phase source of supply, a three-phase load, and means connected between said source and load for supplying said load with three-phase voltage which varies in magnitude and phase relation relative to the source of supply comprising a separate single-phase auto transformer for each phase of said load having a winding connected between the corresponding phase of said source and the other phases through windings on the other transformers, said transformers having adjustable taps independent of the last-mentioned connections connected to said load, the taps on the several transformers being mechanically connected for simultaneous mechanical adjustment.

9. In combination, a three-phase source of supply, a three-phase load, and means connected between said supply and load for supplying said load from said source with a balanced three-phase voltage which may be varied in magnitude and shifted in phase comprising three separate single-phase auto transformers having main and auxiliary windings, the main windings being respectively connected at one end to the three supply phases, taps adjustable along said main windings connected to the load, the adjustable taps on the different transformers being mechanically connected to be adjusted as a unit, and means for connecting said auxiliary windings in delta and such delta connection in star relation between equal voltage points on the main windings of said transformers.

PERCY W. ROBINSON.